(12) United States Patent
Clegg et al.

(10) Patent No.: US 10,208,668 B2
(45) Date of Patent: Feb. 19, 2019

(54) TURBINE ENGINE ADVANCED COOLING SYSTEM

(71) Applicants: Rolls-Royce Corporation, Indianapolis, IN (US); Rolls-Royce North American Technologies Inc., Indianapolis, IN (US)

(72) Inventors: Joseph Clegg, Seymour, IN (US); Craig English, Indianapolis, IN (US); Behram Kapadia, Indianapolis, IN (US); Kenneth M. Pesyna, Carmel, IN (US); Jason Lee Swindle, Moorseville, IN (US); Jason Wayne Rector, Martinsville, IN (US); Christopher Vincent, Indianapolis, IN (US); Nicholas D. Metzger, Fishers, IN (US); Daniel G. Edwards, Brownsburg, IN (US)

(73) Assignees: ROLLS-ROYCE CORPORATION, Indianapolis, IN (US); ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 455 days.

(21) Appl. No.: 14/871,382

(22) Filed: Sep. 30, 2015

(65) Prior Publication Data

US 2017/0089263 A1    Mar. 30, 2017

(51) Int. Cl.
*F02C 7/12*      (2006.01)
*F01D 5/08*      (2006.01)
(Continued)

(52) U.S. Cl.
CPC ............ *F02C 7/12* (2013.01); *F01D 5/02* (2013.01); *F01D 5/046* (2013.01); *F01D 5/08* (2013.01);
(Continued)

(58) Field of Classification Search
CPC ... F01D 5/02; F01D 5/046; F01D 5/08; F01D 5/081; F01D 5/082; F01D 25/08;
(Continued)

(56) References Cited

U.S. PATENT DOCUMENTS

| 2,910,268 A | 10/1959 | Davies et al. | |
| 4,291,531 A * | 9/1981 | Campbell | F02C 7/18 |
| | | | 60/39.511 |

(Continued)

FOREIGN PATENT DOCUMENTS

| DE | 10 2012 208 263 A1 | 11/2013 |
| EP | 2 256 294 A1 | 12/2010 |

OTHER PUBLICATIONS

Extended European Search Report, dated Feb. 23, 2017, pp. 1-8, issued in European Patent Application No. 16166055.0, European Patent Office, The Hague, The Netherlands.

(Continued)

*Primary Examiner* — Scott J Walthour
(74) *Attorney, Agent, or Firm* — Brinks Gilson & Lione

(57) ABSTRACT

A cooling system for a gas turbine is provided that may include a drive shaft, a shield of a combustor of the gas turbine engine, and a conduit. The drive shaft may be configured to mechanically couple a compressor of the gas turbine engine to a turbine of the gas turbine engine. The shield may be positioned between the compressor and the turbine. The combustor may be configured to drive the (Continued)

turbine. The conduit may be configured to supply a cooling fluid to a gap between an outer surface of the drive shaft and the shield of the combustor.

8 Claims, 1 Drawing Sheet

(51) Int. Cl.
*F01D 25/08* (2006.01)
*F02C 7/18* (2006.01)
*F01D 5/04* (2006.01)
*F01D 5/02* (2006.01)
*F01D 25/12* (2006.01)
*F02C 3/04* (2006.01)
*F02C 7/24* (2006.01)
*F04D 29/32* (2006.01)
*F04D 29/58* (2006.01)
*F02C 6/08* (2006.01)

(52) U.S. Cl.
CPC ............ *F01D 5/081* (2013.01); *F01D 5/082* (2013.01); *F01D 25/08* (2013.01); *F01D 25/12* (2013.01); *F02C 3/04* (2013.01); *F02C 6/08* (2013.01); *F02C 7/18* (2013.01); *F02C 7/185* (2013.01); *F02C 7/24* (2013.01); *F04D 29/321* (2013.01); *F04D 29/582* (2013.01); *F05D 2220/32* (2013.01); *F05D 2240/12* (2013.01); *F05D 2240/15* (2013.01); *F05D 2240/35* (2013.01); *F05D 2240/60* (2013.01); *F05D 2260/14* (2013.01); *F05D 2260/20* (2013.01); *F05D 2260/205* (2013.01); *F05D 2260/231* (2013.01)

(58) Field of Classification Search
CPC .... F01D 25/12; F02C 6/08; F02C 7/12; F02C 7/18; F02C 7/185; F02C 7/24; F05D 2240/15; F05D 2240/35; F05D 2240/60; F05D 2260/20; F05D 2260/205; F05D 2260/14
See application file for complete search history.

(56) References Cited

U.S. PATENT DOCUMENTS

| | | | |
|---|---|---|---|
| 4,674,955 A | 6/1987 | Howe et al. | |
| 5,163,285 A | 11/1992 | Mazeaud et al. | |
| 5,187,931 A * | 2/1993 | Taylor | F01D 5/081 60/751 |
| 5,311,734 A * | 5/1994 | Pope | F01D 5/08 415/173.7 |
| 5,317,877 A | 6/1994 | Stuart | |
| 6,250,061 B1 | 6/2001 | Orlando | |
| 7,000,404 B2 * | 2/2006 | Palmisano | F01D 25/12 60/728 |
| 2002/0172591 A1 * | 11/2002 | Glynn | F01D 5/081 415/115 |
| 2003/0223856 A1 | 12/2003 | Yuri et al. | |
| 2007/0089430 A1 * | 4/2007 | Klinger | F01D 5/08 60/785 |
| 2008/0141679 A1 * | 6/2008 | Behaghel | F01D 5/046 60/806 |
| 2010/0028137 A1 * | 2/2010 | Argaud | F01D 11/04 415/176 |
| 2011/0072832 A1 * | 3/2011 | Blanchard | F01D 5/082 60/806 |
| 2011/0088405 A1 * | 4/2011 | Turco | F01D 5/081 60/782 |
| 2012/0087784 A1 | 4/2012 | Widener | |
| 2013/0071242 A1 * | 3/2013 | Caprario | F02C 7/12 415/230 |
| 2013/0323010 A1 | 12/2013 | Mosley et al. | |
| 2015/0000291 A1 * | 1/2015 | Smith | F23R 3/002 60/772 |
| 2015/0047359 A1 * | 2/2015 | Maguire | F02C 7/12 60/726 |
| 2016/0237903 A1 * | 8/2016 | Hiester | F01D 5/081 |
| 2016/0370010 A1 | 12/2016 | Clegg et al. | |

OTHER PUBLICATIONS

European Office Action issued in EP Application No. 16166055.0, dated Oct. 26, 2018, pp. 1-11, European Patent Office, Rijswijk, Netherlands.

* cited by examiner

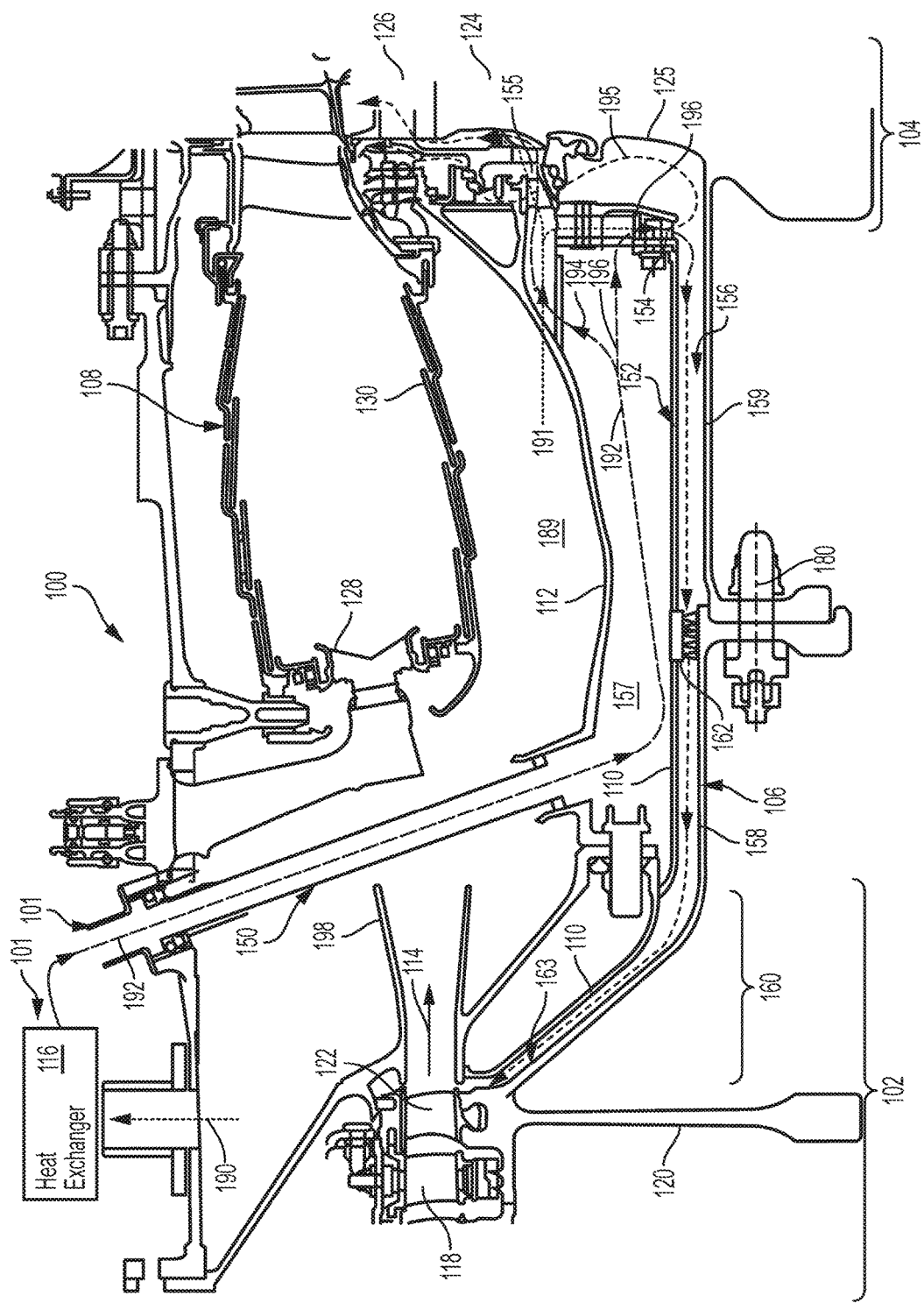

TURBINE ENGINE ADVANCED COOLING SYSTEM

TECHNICAL FIELD

This disclosure relates to turbine engines and, in particular, to cooling systems of turbine engines.

BACKGROUND

Advancements in turbine engine design are leading to increased fuel efficiency. However, designs leading to increased fuel efficiency may have increased run temperatures and increased fatigue on engine parts.

SUMMARY

A cooling system for a gas turbine engine may be provided. The cooling system may include a drive shaft, a shield of a combustor of the gas turbine engine, and a conduit. The drive shaft may be configured to mechanically couple a compressor of the gas turbine engine to a turbine of the gas turbine engine. The shield of the combustor of the gas turbine engine may be positioned between the compressor and the turbine. The combustor may be configured to drive the turbine with a stream of gas. The conduit may be configured to supply a cooling fluid to a gap between an outer surface of the drive shaft and the shield of the combustor.

A gas turbine engine may be provided that includes a compressor, a turbine, a drive shaft, a combustor, and a conduit. The compressor may be linked to the turbine by the drive shaft. The combustor may be arranged between the compressor and the turbine. An outer surface of the drive shaft and a shield of the combustor may define an annular space along a length of the drive shaft. The conduit may be configured to supply a cooling fluid to the annular space along the length of the drive shaft.

A method may be provided for cooling a drive shaft of a gas turbine engine. A cooling fluid may be routed through a conduit to a gap between a panel and an outer surface of the drive shaft. The drive shaft may link a compressor and a turbine of the gas turbine engine. The panel may at least partially wrap around the drive shaft.

BRIEF DESCRIPTION OF THE DRAWINGS

The embodiments may be better understood with reference to the following drawings and description. The components in the FIGURES are not necessarily to scale. Moreover, in the FIGURES, like-referenced numerals designate corresponding parts throughout the different views.

FIG. 1 illustrates a gas turbine engine with a cooling system for the same.

DETAILED DESCRIPTION

A gas turbine engine may comprise, for example, a compressor, a turbine, a drive shaft, a combustor, a shield, and a cooling system. The drive shaft may mechanically link the compressor to the turbine. The shield may be positioned between the drive shaft and the combustor. The shield and the combustor may be positioned between the compressor and the turbine.

The cooling system in the gas turbine engine may include one or more conduits. A conduit may supply a cooling fluid, such as air, to an annular space or gap along the drive shaft. The annular space may be defined by the shield and an outer surface of the drive shaft.

One technical advantage of the systems and methods described below may be that the compressor may operate at increased temperatures, increasing engine efficiency, but causing greater thermal stresses on engine parts. Cooling engine parts which heretofore have not been previously cooled may counteract negative effects on reliability of the compressor or other parts of the turbine engine otherwise caused by increased thermal stresses.

FIG. 1 illustrates an example of a gas turbine engine 100. The gas turbine engine 100 may include a compressor 102, a turbine 104, a drive shaft 106, a combustor 108, a shield 110 between the combustor 108 and the drive shaft 106, and a cooling system 101. The gas turbine engine 100 may be an engine in which air or another gas is heated in the combustor 108, and the gas expands to drive blades 126 (one shown) of the turbine 104. Examples of the gas turbine engine 100 may include, but are not limited to, a turbojet engine, a turbofan engine, and a turboshaft engine. The gas turbine engine 100 may be referred to herein simply as the engine 100.

The compressor 102 of the engine 100 may be a mechanical component that increases the pressure of a fluid, such as air that enters the engine 100. The compressor 102 may have an axial design and may include one or more stages comprising stationary blades 118 and rotating disks 120, the rotating disks 120 coupled to blades 122 that rotate with the disks 120. The disks 120 may be coupled to, or integral with, the drive shaft 106 or another shaft mechanically coupled to the drive shaft 106. Alternatively, the compressor 102 may have a centrifugal design and may include one or more stages comprising stationary blades, rotating impeller disks, and a drive shaft, among other components. Examples of compressors may include axial flow compressors, centrifugal flow compressors, or any other type of device that compresses a fluid, including, but not limited to compressors which compress a fluid without any moving parts.

The turbine 104 may be a mechanical device that converts energy from a fluid flow, such as from the heated gas that flows from the combustor 108, to rotational energy. The turbine 104 may include one or more stages comprising stationary blades (not depicted), rotating turbine disks 124 (one shown) coupled to rotating blades 126, and a drive shaft 106, among other components. Examples of turbines may include impulse turbines and reaction turbines.

The drive shaft 106 may be a mechanical component that transmits torque (rotational force) between two components. The drive shaft 106 may mechanically couple the compressor 102 to the turbine 104. In some configurations, the compressor 102 and the turbine 104 may be separate sections interconnected to one another via multiple drive shafts. As such, the drive shaft 106 may comprise a single part or multiple parts. The drive shaft 106 may be a solid or hollow cylinder or some other shaped component. In the example illustrated in FIG. 1, the drive shaft 106 comprises an extension 158 of the compressor 102 and an extension 159 of the turbine 104, where the extension 158 of the compressor 102 is coupled to the extension 159 of the turbine 104 by a fastener 180.

The combustor 108 may be a component in which a fuel is mixed with compressed air, ignited, and burned. The combustor 108 may include, for example, a case 112, a liner 130, and a fuel injector 128. Examples of the combustor 108 may include can combustor, a cannular combustor, and an annular combustor.

The shield 110 may be a protective barrier positioned between the combustor 108 and the drive shaft 106. Alternatively or in addition, the shield 110 may be a panel that wraps at least partially or completely around the drive shaft 106. The panel may serve to limit turbulence around the drive shaft 106 caused by the rotation of the drive shaft 106. The shield 110 may form an outer wall of an annular space 156 or gap, where an outer wall of the drive shaft 106 forms an inner wall of the annular space 156 or gap. Examples of the shield 110 may include a heat shield, a curved panel, and a panel of any shape. As described in more detail below, the cooling fluid may flow through the annular space 156.

The cooling system 101 may be one or more components that cool a target portion of the engine 100. The cooling system 101 may include a heat exchanger 116, a first conduit 150, a second conduit 152, a radial pre-swirler 154, and an axial pre-swirler 155. The cooling system 101 may include additional, fewer, or different components than illustrated in FIG. 1. For example, the cooling system 101 may not include the heat exchanger 116. The cooling system 101 may provide a cooling fluid, such as cooling air 190 or cooled cooling air 192 to the target portion of the engine 100. Each of the conduits, including the first conduit 150 and the second conduit 152, may be a channel or pathway, not necessarily of circular cross-section, which conveys the cooling fluid such as the cooled cooling air 192 or the cooling air 190.

A compressor rear cone 160 may be a portion of the drive shaft 106 or a portion of the compressor 102 where the radius of the drive shaft 106 or the radius of the portion of the compressor 102 increases to encompass or meet a compressor disk 120. The compressor rear cone 160 and the drive shaft 106 may also be distinct parts coupled to one another.

During operation of the cooling system 101 and the gas turbine engine 100, the cooling system 101 may bleed the cooling air 190 off of the compressor 102 or some other source, and route the cooling air 190 to the heat exchanger 116. The heat exchanger 116 may in turn produce the cooled cooling air 192. The conduits, such as the first conduit 150 and a conduit formed by the shield 110 and case 112, may route the cooled cooling air 192 to one or more target locations. In a first configuration, the cooling system 101 may mix the cooled cooling air 192 with compressor discharge air 191 to provide sufficient flow through the axial pre-swirler 155 to cool upper turbine components. The compressor discharge air 191 may have a higher pressure than the cooled cooling air 192. Accordingly, mixing the compressor discharge air 191 and the cooled cooling air 192 may raise the pressure of the cooled cooling air 192 to provide sufficient flow through the axial pre-swirler 155. The compressor discharge air 191 may include compressor outlet air 114 that passes through a combustor chamber 189. The compressor outlet air 114 may be compressed air that exits the compressor 102, for example, through a diffuser 198. The compressor discharge air 191 may pass from the combustion chamber 189 through a hole (not shown) in the case 112 and then mix with the cooled cooling air 192. In a second configuration of the cooling system 101, the cooling system 101 may not mix the cooled cooling air 192 with the compressor discharge air 191. In a third configuration of the cooling system 101, the cooling system 101 may not include the heat exchanger 116. Examples of the cooling system 101 may include an air cooled cooling system, a liquid cooled system, or any combination thereof.

The first conduit 150 may be a tube configured to route the cooling fluid from the heat exchanger 116 or other source to a gap or an annulus 157 formed between the case 112 of the combustor 108 and the shield 110. In an alternative example, the first conduit 150 may run through or along the compressor discharge diffuser 198. The second conduit 152 may comprise all or a portion of the gap 156 between the shield 110 and a portion of the drive shaft 106. The gap 156 may be referred to herein also as an annular space. The cooling fluid, such as the cooled cooling air 192, mixed with the compressor discharge air 191 of higher pressure, may be routed from the annulus 157 between the case 112 and the shield 110 through the radial pre-swirler 154. The cooling fluid 156 may the flow through all or a portion of the second conduit 152. The radial pre-swirler 154 may be any component configured to direct the cooling fluid in a direction of rotation of the drive shaft 106. In some examples, the radial pre-swirler 154 may accelerate the cooling fluid to substantially the same rotational speed of the drive shaft 106.

A first portion 194 of the cooling fluid in the annulus 157 between the case 112 of the combustor 108 and the shield 110 may be routed through the axial pre-swirler 155 toward a turbine disk 124 of the turbine 104. A second portion 196 of the cooling fluid may be routed to the second conduit 152 and flow along the drive shaft 106. A pressure applied against the cooling fluid may force the cooling fluid to flow along the second conduit 152 in the annular space 156. The second portion 196 of the cooling fluid may flow toward the compressor 102 through the second conduit 152, between the shield 110 and the outer surface of the drive shaft 106, removing heat from the drive shaft 106 as the cooling fluid flows.

In some configurations, not all of the second portion 196 of the cooling fluid may flow toward the compressor 102. Instead, a diverted portion 195 of the second portion 196 cooling fluid exiting the radial pre-swirler 154 may flow against a base 125 of the turbine disk 124. Alternatively, the diverted portion 195 of the cooling fluid may come from another source or conduit.

The second portion 196 of the cooling fluid may continue to flow along the outer surface of the drive shaft 106 including along an outer surface 163 of the compressor rear cone 160. The cooling fluid may pass along the outer surface 163 of the compressor rear cone 160 and join the compressor outlet air 114.

The second conduit 152 may include a flow restrictor 162 within the second conduit 152. The flow restrictor 162 may be a knife seal, a pressure regulator, or any other suitable device. The flow restrictor 162 may govern the flow within the second conduit 152 to limit or prevent the compressor outlet air 114 from flowing into the second conduit 152. In addition, the flow restrictor 162 may allow the cooling fluid to flow through the second conduit 152 and into the compressor outlet air 114, thereby cooling the drive shaft 106 and, in some examples, the compressor rear cone 160. In some examples, the flow restrictor 162 may limit the flow of the cooling fluid so as to limit efficiency loss from the cooling fluid joining the compressor outlet air 114.

The gas turbine engine 100 may include more, fewer, or different elements than illustrated in FIG. 1. For example, the gas turbine engine 100 may also include one or more compressor sections operating independently from one another and driven by one or more turbine sections connected by separate and independent drive shafts.

As indicated above, the cooling system 101 may include additional, fewer, or different components than illustrated in FIG. 1. In some examples, the source of the cooling fluid may be air routed from an intake fan (not shown) of the gas turbine engine 100. The cooling fluid may be air other than the cooled cooling air 192. Instead, for example, the air routed from the intake fan may be the cooling fluid that is routed to the first conduit 150 without passing through a heat exchanger.

A method of cooling the gas turbine engine 100 may be provided. The cooling fluid may be routed through the first conduit 150 to the gap 156 between the panel 110 and the outer surface of the drive shaft 106. The drive shaft 106 may link the compressor 102 and the turbine 104 of the gas turbine engine 100. The panel 110 may wrap around the drive shaft 106.

The cooling fluid may be routed along the outer surface of the drive shaft 106 for a length of the drive shaft 106. The length of the drive shaft 106 and the gap 156 may span from the compressor 102 to the turbine 104.

Alternatively or in addition, a flow against the cooling fluid may be generated that is sufficient to force the cooling fluid along the outer surface of the drive shaft 106 into compressor discharge air 114. Alternatively or in addition, the flow against the cooling fluid may be generated that is sufficient to prevent a non-cooling fluid from entering the gap 156 between the panel 110 and the outer surface of the drive shaft 106. In one example, the cooling fluid may pass through the annular space 156 extending from the compressor rear cone 160 to the turbine disk 124.

All of the discussion, regardless of the particular implementation described, is exemplary in nature, rather than limiting. For example, although the cooling fluid has been described as air, another fluid may also be used as the cooling fluid, including, but not limited to, bleed air, cooled air, cooled cooling air, cooled duct off-take air, or any liquid. Duct off-take air may be air taken from a fan bypass duct.

While various embodiments have been described, it will be apparent to those of ordinary skill in the art that many more embodiments and implementations are possible. Accordingly, the embodiments described herein are examples, not the only possible embodiments and implementations.

What is claimed is:

1. A gas turbine engine defining a longitudinal axis, the gas turbine engine comprising:
    a compressor;
    a turbine;
    a combustor arranged axially between the compressor and the turbine and configured to drive the turbine with a stream of gas, the combustor comprising at least one liner defining a combustion chamber;
    a shield positioned axially between the compressor and the turbine, wherein the shield extends from a first plane positioned axially forward of the combustor to a second plane extending through an aft end of the combustion chamber, the first plane and the second plane each being perpendicular to the longitudinal axis;
    a combustor case;
    a drive shaft mechanically coupling the compressor to the turbine;
    a conduit configured to supply a cooling fluid to an annulus defined by the combustor case and the shield, the annulus configured to supply the cooling fluid to a first end of a gap between an outer surface of the drive shaft and the shield, the drive shaft and the shield configured to guide the cooling fluid from the first end of the gap to a second end of the gap, wherein the cooling fluid flows from the second end of the gap into an outlet of the compressor during operation of the gas turbine engine;
    a flow restrictor positioned in the gap and located between the first end of the gap and the second end of the gap, wherein the flow restrictor is a seal, wherein the seal is configured to limit fluid flow through the gap; and
    a radial pre-swirler configured to direct the cooling fluid from the annulus toward the drive shaft and into the gap, the radial pre-swirler configured to swirl the cooling fluid in a direction of rotation of the drive shaft, the radial pre-swirler positioned at an aft end of the shield and axially aft of the flow restrictor.

2. The gas turbine engine of claim 1, wherein the shield is stationary relative to the drive shaft and the drive shaft rotates about an axis of the drive shaft.

3. The gas turbine engine of claim 1, wherein the seal comprises a knife seal.

4. The gas turbine engine of claim 1, wherein the radial pre-swirler is further configured to supply the cooling fluid to a base of a turbine disk of the turbine.

5. The gas turbine engine of claim 1, wherein the cooling fluid is air.

6. The gas turbine engine of claim 1, further comprising a heat exchanger configured to generate the cooling fluid as cooled duct off-take air.

7. The gas turbine engine of claim 1, wherein the gap is configured to route the cooling fluid along the outer surface of the drive shaft for a length of the drive shaft, wherein each of the length of the drive shaft and the gap spans from the compressor to the turbine.

8. The gas turbine engine of claim 1, further comprising an axial pre-swirler configured to direct the cooling fluid from the annulus toward a turbine disk of the turbine.

\* \* \* \* \*